US006267079B1

(12) United States Patent
Eby

(10) Patent No.: US 6,267,079 B1
(45) Date of Patent: Jul. 31, 2001

(54) FISH CAGE

(76) Inventor: Lisa A. Eby, 505 Fisher St., Morehead City, NC (US) 28557

( * ) Notice: Subject to any disclaimer, the term of this patent is extended or adjusted under 35 U.S.C. 154(b) by 0 days.

(21) Appl. No.: 09/383,303

(22) Filed: Aug. 26, 1999

(51) Int. Cl.[7] ............................................. A01K 63/04
(52) U.S. Cl. .......................... 119/226; 43/100; 43/101
(58) Field of Search .................................. 119/452, 226, 119/228, 221, 223; 43/100, 102, 103, 105

(56) References Cited

U.S. PATENT DOCUMENTS

| | | | |
|---|---|---|---|
| 3,561,402 | 2/1971 | Ishida et al. ........................... | 119/221 |
| 4,075,779 | * 2/1978 | Olafson ................................. | 43/100 |
| 4,079,698 | 3/1978 | Neff et al. ............................. | 119/223 |
| 4,086,875 | 5/1978 | Lindbergh ............................. | 119/216 |
| 4,164,199 | 8/1979 | Pequegnat ............................. | 119/200 |
| 4,170,196 | 10/1979 | Yoneya ................................. | 119/223 |
| 4,252,081 | 2/1981 | Smith ................................... | 119/223 |
| 4,429,659 | 2/1984 | Holyoak ............................... | 119/223 |
| 4,615,301 | 10/1986 | Maekawa et al. ..................... | 119/223 |
| 4,982,697 | 1/1991 | Neff ..................................... | 119/200 |
| 5,009,189 | 4/1991 | Neff ..................................... | 119/200 |
| 5,329,719 | 7/1994 | Holyoak ............................... | 43/6.5 |
| 5,357,708 | * 10/1994 | Peters et al. .......................... | 43/100 |

* cited by examiner

Primary Examiner—Charles T. Jordan
Assistant Examiner—Judith A. Nelson
(74) Attorney, Agent, or Firm—C. Richard Eby; Wood, Herron & Evans L.L.P.

(57) ABSTRACT

A fish cage having a frame structure defining an enclosure with a top and a bottom and an intersecting side. The frame is adapted to rest on the bottom of an outdoor body of water and is covered with a first netting on the top and side but not the bottom. The first netting has mesh openings sized to permit ambient water and suspended particles therein to circulate through the cage but prevent predators and competitors for food of the fish under study from entering the cage. A second netting covers the bottom of the enclosure. The second netting has second mesh openings larger than the first mesh openings and sized to prevent the fish being studied from leaving the enclosure as well as permit plant and animal life at the bottom of the body of water to enter the enclosure, thereby providing a more natural environment for the fish under study. The enclosure includes a door to permit access to the interior of the enclosure.

16 Claims, 1 Drawing Sheet

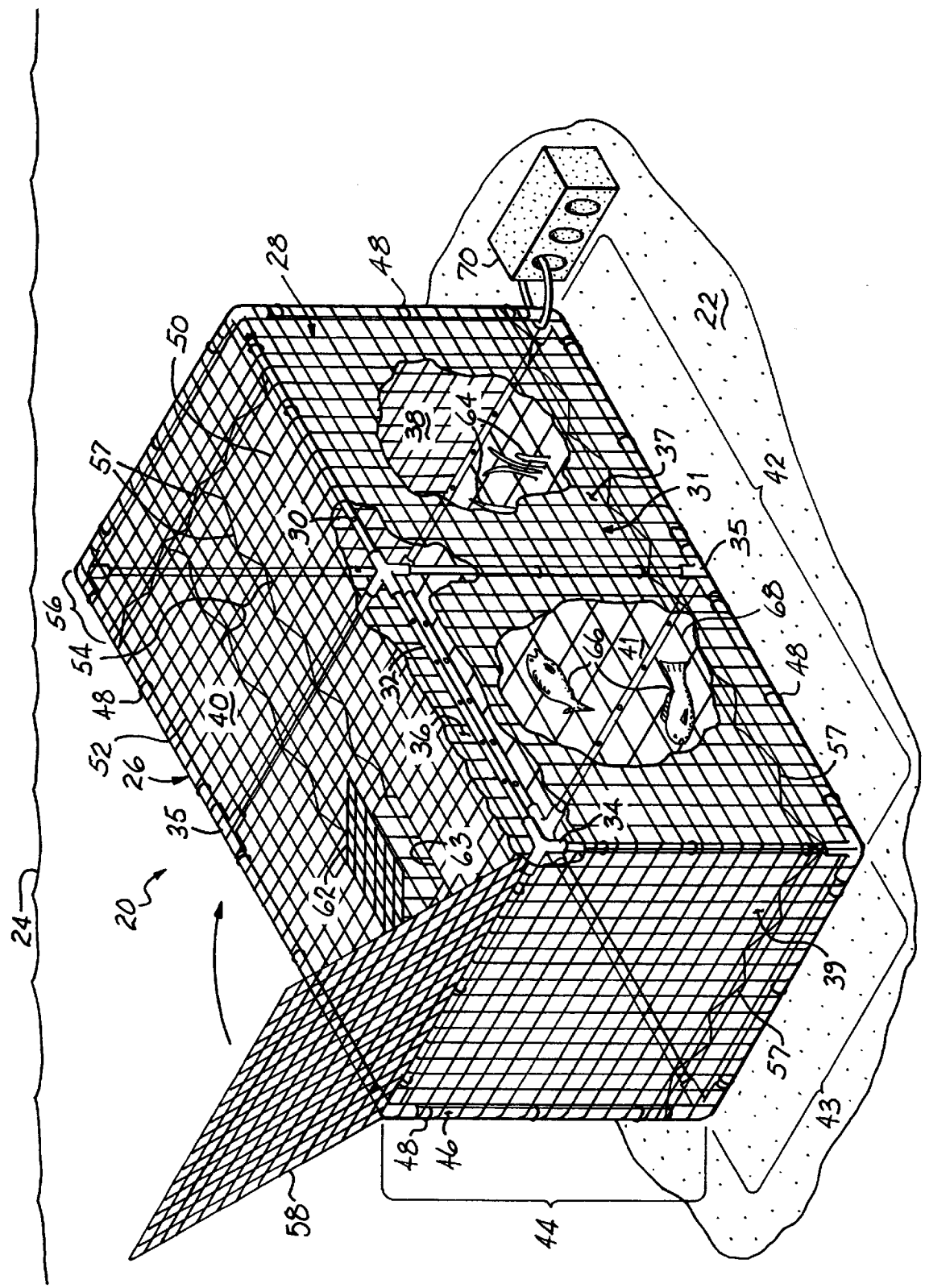

FISH CAGE

FIELD OF THE INVENTION

This invention relates generally to the field of fish containment devices and, more particularly, to an improved open water fish cage.

BACKGROUND OF THE INVENTION

Aquatic net cages or pens of various shapes and sizes have been used for many years to contain fish for the purposes of research, breeding and raising fish for food. Cages designed for the breeding and/or raising of fish for consumption either float or rest at the bottom of an outdoor body of water. Generally, such cages have an access opening in the top of the cage and are often designed to retain man-made fish food within the cage by providing an overlay of netting on the cage bottom with a mesh size that is substantially smaller than the other netting that covers the cage. Such cages may also include fish grading screens of either netting or parallel bars to separate the smaller fish prior to harvesting the larger fish.

Aquatic net cages for research purposes are also known. For example, some cages are designed to study the effect of pollutants on fish growth. However, such cages are often designed to isolate the different species being studied from each other and/or predators. Thus, such cages have a very specialized research purpose and a relatively complicated construction. In other studies, round cages suspended in a body of water may be used to study the predatory behavior of fish populations.

It is also known to use cages that rest at the bottom of a body of water to study in situ fish growth. Fish growth is affected by environmental conditions, such as the availability of food, dissolved oxygen concentrations, water temperature, pollutants, etc. Therefore, in contrast to cages in which fish are raised for consumption, in fish growth studies, preferably, all of the food should come from the local environment; and no man-made food should be provided. Cages to study fish growth are often bottomless, so that the plant and animal life is readily available as food for fish being studied. However, a bottomless cage has several disadvantages. First, access to the cage is through a relatively small opening or door generally in the top of the cage, and thus, removal of fish from the cage must be done with a dip net or suction gun. In turbid water in which the visibility is limited, the removal of fish from a bottomless cage with a dip net or other device is very difficult and time consuming. In very turbid water with close to zero visibility, such a task is almost impossible. Further, deploying and retrieving fish in a bottomless fish cage in turbid water from a boat is also very difficult if not impossible. Therefore, fish growth studies using bottomless cages must be limited to less turbid or shallower waters. Further, in view of the difficulties in handling fish in a bottomless cage, such cages are often made smaller, thereby severely limiting available food supply and thus, the number of fish that can be studied in each cage.

Therefore, there is a need to provide an improved fish cage for in situ fish growth studies that does not have the disadvantages of known cages.

SUMMARY OF THE INVENTION

The present invention provides an improved fish cage that permits fish to be easily handled during in situ fish growth studies that are performed in deeper waters and in turbid waters, even waters having zero visibility. Further, the above is achieved by a fish cage design that protects the fish being studied from predators and competitors for food while permitting both ambient water with suspended particles to circulate through the cage and plant and animal life on the bottom of the water to enter the cage. Thus, the fish in the cage of the present invention can live for extended periods of time in their natural feeding environment. The fish cage of the present invention has the further advantage of permitting the cage to be easily removed from the water with complete retrieval of the fish being studied. Another advantage is that the cage may be made relatively large so that larger fish populations can be studied, and in addition, advantageously, the fish cage of the present invention is economical, simple to manufacture and has a durable long life.

In accordance with the principles of the present invention and in accordance with the described embodiments, the present invention provides a fish cage having a frame defining an enclosure having a top, a bottom and an intersecting side wall. The frame is adapted to rest at the bottom of an outdoor body of water and is covered with a first netting on the top and side wall but not the bottom. The first netting has mesh openings sized to permit ambient water and suspended particles therein to circulate through the cage but prevent predators and competitors for food of the fish under study from entering the cage. A second netting covers the bottom of the enclosure, and the second netting has second mesh openings larger than the first mesh openings. The second mesh openings of the second netting are sized to first, prevent the fish being studied from leaving the cage and second, to permit the natural environment of plant and animal life at the bottom of the body of water to enter the enclosure, thereby providing a more natural environment for the fish under study. The enclosure includes a door permitting access to the interior of the enclosure.

In one aspect of the invention, the frame is multilateral, for example, rectangular, and made from perforated plastic tubing. In another aspect of the invention, the door is a flap of netting cut from the wall or the top of the enclosure. In a still further aspect of the invention, a second door of a netting material covers the first door.

These and other objects and advantages of the present invention will become more readily apparent during the following detailed description together with the drawing herein.

BRIEF DESCRIPTION OF THE DRAWING

The FIGURE is a cut-away perspective view of the fish cage in accordance with the principles of the present invention.

DETAILED DESCRIPTION OF THE INVENTION

Referring to the FIGURE, the fish cage 20 is adapted to rest at the bottom 22 of an open body of water 24. The fish cage 20 is comprised of a frame structure 26 covered by a netting or other net-like material 28. The frame 26 defines the outer boundaries of the fish cage 20 and is normally multilateral, for example, rectangular. The frame 26 is preferably made of an extruded pipe or tubing material having perforations 30 permitting water to enter the interior of the pipe, thereby removing any buoyancy the pipe may have and causing the frame 26 to rest on the bottom 22. The frame is constructed by connecting a plurality of straight pipe sections 32 with molded double elbow fittings 34 and molded double T-fittings 35. The straight pipe sections 32 can be connected to the fittings 34, 35 by any known technique including adhesives, welding, fasteners, etc. Preferably, the pipe 32 and fittings 34, 35 are made from a one inch diameter polyvinyl chloride, however, they may be made from any other plastic material as well as a metal or a pressed paper material. Further, the frame 26 may be made of materials having a noncircular shape as well as materials of different sizes. In addition, the frame may be made from concrete reinforcing bar or another solid bar instead of tubular materials; however solid materials weigh more and will make the cage more difficult to handle. In the example of the present invention, the frame has two side walls 36, 37, two end walls 38, 39, a top wall 40 and a bottom wall 41; and the frame 26 has a length 42 of approximately 60 inches, a width 43 of approximately 40 inches and a height 44 of approximately 20 inches.

The netting or net-like material 28 may be any commercial netting material, for example, a "VEXAR" polyethylene or polypropylene plastic netting material commercially available from DuPont. The netting in the FIGURE is schematically shown as having a square mesh, however, as will be appreciated, any mesh shape, for example, diamond or other quadrilateral, hexagonal, octagonal, and circular or other curved mesh shapes, etc. may be used. The first netting 31 for the sides and top of the cage is chosen to have a mesh size large enough to permit ambient water and suspended particles therein to circulate through the cage. However, the mesh size of the first netting 31 must be small enough to prevent predators from entering the cage as well as non-predators who compete with the fish being studied for the available food supply within the cage. If the mesh size of the first netting 31 is too large, competitors for food and potential predators may enter the cage early in a growth cycle, and after growing in the cage, become significant competitors for food or predators of the fish being studied. For example, after molting, a blue crab is very flexible, can squeeze through small openings and may enter the cage. However, after entering the cage, the crab may grow to a size too large to leave the cage and become a predator of the fish being studied in the cage. Therefore, the mesh size of the netting 31 on the sides, ends and top of the cage is chosen first, to permit water currents to wash plant and animal life into or onto the cage on which the fish being studied can forage and second, to prevent other fish competing for food and predators and competitors for food of the fish under study from entering the cage 20. If, for example, the fish being studied are juvenile croaker having a length in the range of approximately 90 millimeters ("mm") to 120 mm, then a mesh size for the first netting 31 on the sides 36, 37, ends 38, 39 and top 40 of the cage 20 is chosen to be in the range of approximately 0.25 inches to 0.375 inches.

After the frame 26 is constructed, the netting may be applied to the frame in many different ways, and one such process will be described in detail. A piece of first netting 31 is cut to a length that is slightly longer than twice the cage length 42 and the cage width 43. The netting 31 is cut to a width that is slightly greater than the cage height 44 plus more than half the cage width 43. Thus, given the frame size example recited above, the netting 31 is cut to a length of approximately 206 inches and a width of approximately 43 inches. One end of the first netting 31 is connected to one corner post, for example, post or frame member 46, with tie-wraps 48 such that the edge of the netting 31 is flush with the bottom and the netting 31 extends above the top of the cage by a distance greater than one-half the height 44, for example, using the current example, approximately 23 inches.

A tie-wrap 48 is an elongated plastic member having one end that is looped around objects to be joined and then passed through an opening in the other end, thereby progressively tightening the tie-wrap around the objects. Thus, an end of the tie-wrap 48 is looped around post 46, through openings in the netting 31 and then through the other end of the tie-wrap 48. The one end is then pulled tight, thereby securing the netting within the tie-wrap 48 around the pipe section.

The length of the first netting 31 is then successively wrapped around the rear side 36, the right end 38, the front side 37, the left end 39 and around the post 46 to overlap with itself on the rear side 36. The wrapped netting 31 is then tie-wrapped to the post 46, and the overlapping loose end of the netting 31 is then stitched to the underlying netting on the rear side 36 using 20 pound fish line. At this point, the sides 36, 37 and ends 38, 39 of the fish cage are in place, however, netting extends above the frame 26 approximately 23 inches on all four sides. That extended netting is then cut at the four corners to provide four flaps of extended netting contiguous with the sides 36, 37 and ends 38, 39.

The extended netting 50 on the forward side 37 of the cage 20 is folded toward the rear side 36 and the extended netting 52 on the rear side 36 is folded forward so that the folded netting portions 50, 52 cover the top 40 of the cage 20 with an overlap 54 of approximately 5 inches with the folded front side 50 located beneath the folded rear side 52. The overlapping folded netting 50, 52 may be tie-wrapped or partially stitched to hold it in place while the ends are folded and a door is made. The extended netting 56 at one end, for example, the right-hand end as viewed in the FIGURE, may be left as is or trimmed so that it extends above the top of the cage by a lesser amount. The extended netting 56 is folded over the top 40 of the cage 20, and the netting 56 is tie-wrapped to upper frame members, and the edges of the netting 56 are stitched together using 20 pound fish line 57.

The top at the left end of the cage as viewed in the FIGURE is next provided with a cage door. First, it is desirable that the extended netting 58 at the left end extending above the top 40 of the cage 20 be cut or separated from the netting portions 50, 52 folded over to form the top 40 of the cage 20. In addition, it is desirable that the extended netting 58 be in the form of a simple flap that is extendable over the top 40 of the cage. Therefore, extra netting at the corners of the extended netting 58 is cut away to form the desired flap configuration. The left end flap 58 is then folded to the left, away from, and off of the top of, the cage 20. The edges of the folded side pieces 50, 52 extending over the top 40 of the cage 20 are then stitched together as desired using 20 pound fish line 57. However, the edges of the netting pieces 50, 52 that are located where a door in the top of the cage is to be located are not stitched. Next, two parallel cuts are made from the forward edge of the netting piece 52 toward the rear side 36 of the cage 20, thereby forming a flap or door 62 in the top wall 40 of the cage 20. The door 62 provides access to the cage 20 via an opening 63 through which fish are placed in, and retrieved from, the enclosure of the cage 20. Preferably, the door 62 is located close to the left side 39 of the cage such that when the end flap 58 is folded over the top 40 of the cage 20, the flap 58 covers the door 62 completely, thereby forming a secondary door.

The secondary door flap 58 provides additional protection for the first door flap 62. The door flap 62 is secured closed in the field, often in a boat rocking in swells, and must be done relatively quickly. Therefore, the first door flap 62 is often less tightly secured, and the second door flap 58 is effective to provide additional security to prevent predators and competitors for food from entering the cage. Further, the secondary door flap 58 provides additional physical security. It is common for objects to be dragged over the top of the fish cage and for boat hulls to pass over and contact the top of the fish cage. Thus, without the secondary door flap 58, it is possible for such an object to catch onto and partially or fully open the first door 62. Once again, the secondary door flap 58 provides additional protection for the first door 62 from items contacting the cage in a manner tending to open the door flaps 62 and 58.

Next, the bottom 41 of the cage 20 is made. It is desired that the bottom 41 of the cage permit animal and plant life 64 to enter the cage from the bottom wall 41 so that the fish 66 being studied may forage on the natural food 64. However, the size of the mesh of the netting 68 of the bottom 41 of the cage must be small enough so that the fish 66 being studied cannot escape when the cage 20 is removed from the bottom 22 of the water 24. Normally, the fish being studied are not exposed to predators coming through the bottom of the cage. In the example above, where the fish 66 being studied are juvenile croaker having a length in the range of approximately 90 mm to 120 mm, then a mesh size for the netting 68 on the bottom 41 of the cage 20 is in the range of approximately twice the size of the mesh on the sides 36, 37, ends 38, 39 and top 40, that is, 0.50 inches to 0.75 inches. The netting 68 for the bottom 41 is cut so that the area of the netting corresponds to the length and width of the cage plus approximately 6 inches in each direction. Thus, the bottom netting 68 covers the bottom of the cage and extends up and overlaps the two side walls 36, 37 and the two end walls 38, 39 by approximately 3 inches. After, the bottom netting 68 is located with respect to lower sections of the frame 26, tie-wraps 48 are used to connect the netting 68 to the lower frame sections, and the peripheral edges of the bottom netting 68 overlapping the side and end walls 36–39 are stitched to the underlying side and end walls with 20 pound fish line 57. The cage construction is now complete, and the cage 20 is ready for use.

In use, the cage 20 may be deployed from the shore or from a boat. The construction of the cage is particularly advantageous when being deployed from a boat and in turbid water. When being deployed from a boat, the right end 38 is placed in the water 24 with the door 62 being left above the surface of the water 24. The flaps 58, 62 are pulled back and the cage 20 is stocked with the fish 66 being studied. The inner door or flap 62 is then stitched shut and the outer flap or door 58 is held shut with either stitches or one or more bungee cords. The cage 20 is lowered into the water 24 and located on the bottom 22. The cage 20 is then manipulated to push it into the top layer of silt on the bottom 22, thereby bringing the animal and plant life 64 through the larger mesh of the netting 68 into the cage 20. Thus, the netting 68 having the larger mesh on the bottom 41 of the cage is as effective as a bottomless cage in providing available food for the fish being studied. By optimizing the animal and plant life 64 available to the fish 66, the most natural possible environment is provided. Therefore, the effect of different environmental factors in the water 24, including pollutants on the growth rates of the fish 66, can be more accurately determined. After the cage 20 is in place, it is anchored by tying it to concrete blocks or other weights at the four corners only one of which is shown schematically by a block 70. Anchoring the cage 20 prevents it from being turned over by stronger currents. If the cage turns over, the fish being studied are exposed to predators that can penetrate the larger mesh of the bottom netting.

At the end of the growth study period, for example, three weeks, the anchors 70 are removed; and the cage 20 is lifted from the bottom 22 and into the boat. The cage 20 is set on its left end 39, or the end with the door 62. The fish being studied drop to the lower end 39 of the cage 20 next to the doors 58, 62. The door flaps 58, 62 are quickly released, and fish being studied are removed from the cage 20.

As will be appreciated, the fish cage 20 is a substantial improvement over other in situ fish cages previously used to study the effects of environmental conditions on fish growth rates. The fish cage 20 of the present invention has the advantage of being able to stock and easily retrieve all of the fish from the cage whether being deployed from a boat or in turbid waters. Further, the fish cage 20 provides the fullest natural environment to the fish being studied, thereby allowing the fish to live on natural food in the environment over extended study periods. Further still, the fish cage 20 more effectively prohibits predators and competitors for food from entering the cage. In addition, the cage may be made relatively large so that larger fish populations can be studied. The fish cage of the present invention has the further advantage of being simple and economical to manufacture and has a durable, long life.

While the invention has been set forth by a description of the preferred embodiment in considerable detail, it is not intended to restrict or in any way limit the claims to such detail. Additional advantages and modifications will readily appear to those who are skilled in the art. For example, as will be appreciated, the cage 20 can be any size that is appropriate for the fish being studied. Further, the mesh size of the first netting 31 on the sides 36, 37, ends 38, 39 and top 40 of the cage 20 and the mesh size of the second netting 68 on the bottom 41 of the cage 20 will vary with the nature of the study being done. However, as a general rule, the mesh size of the second netting 68 on the bottom 41 of the cage 20 will be substantially larger than the size of the mesh of the first netting 31 on the other sides of the cage 20. While a rectangular multilateral shape of the cage 20 is described, as will be appreciated, the cage 20 may have other shapes, such as hexagonal, octagonal, etc., as well as a cylindrical shape. Further, in the preferred embodiment, all of the edges of the netting overlap with an adjoining piece of netting, however, as will be appreciated, the edges of the netting may butt with each other so that there is no overlap.

In the described example, tie-wraps 48 are used to secure the netting to the frame 26 of the cage 20. As will be appreciated, other ties, for example, flexible wire, water proof string, rigid wire clips, or any other known securing device or connecting clip may be used instead. Further, in the described example, the cage 20 is left in place during the full term of the experiment. However, if desired, the cage 20 may be lifted off the bottom 22, and the fish 66 removed for measurement at periodic intervals during the term of the experiment.

Therefore, the invention in its broadest aspects is not limited to the specific detail shown and described. Consequently, departures may be made from the details described herein without departing from the spirit and scope of the claims which follow.

What is claimed is:

1. A cage for raising fish and adapted to rest on the bottom of an outdoor body of water, the cage comprising:

a frame defining outer boundaries of an enclosure having a top, a bottom and a side wall intersecting the top and bottom of the enclosure;

a first netting with first mesh openings covering the top and side wall but not the bottom of the enclosure;

a second netting covering the bottom of the enclosure, the second netting having second mesh openings larger than the first mesh openings; and a first door disposed in one of the top, bottom and side wall permitting access to the enclosure.

2. A cage for raising fish and adapted to rest on the bottom of an outdoor body of water, the cage comprising:

a frame defining outer boundaries of an enclosure having a top, a bottom and a side wall intersecting the top and bottom of the enclosure;

a first netting covering the top and side wall but not the bottom, the first netting having mesh openings sized to prevent predators of the first from entering the enclosure bounded by the first netting;

a second netting covering the bottom of the enclosure, the second netting having second mesh openings larger than the first mesh openings and sized to prevent the fish from leaving the enclosure bounded by the second netting; and a first door disposed in one of the top, bottom and side wall permitting access to the enclosure.

3. A cage for raising fish of claim 2 wherein the frame is multilateral and comprises a plurality of sides intersecting the top and the bottom of the enclosure.

4. A cage for raising fish of claim 2 wherein the door comprises a flap of the first netting being cut in the one of the top, bottom and side wall of the enclosure.

5. A cage for raising fish of claim 4 wherein the flap of first netting is cut in the top of the enclosure.

6. A cage for raising fish of claim 4 further comprising a second door overlaying the first door.

7. A cage for raising fish of claim 6 wherein the second door is a flap of the first netting.

8. A cage for raising fish of claim 6 wherein the second door is a flap of the first netting extending from an end of the enclosure.

9. A cage for raising fish of claim 2 wherein the frame structure is made from a tubing material.

10. A cage for raising fish of claim 9 wherein the tubing is a plastic tubing material.

11. A cage for raising fish of claim 9 wherein tubing material is perforated.

12. A cage for raising fish of claim 9 wherein the tubing material has a diameter of approximately one inch.

13. A cage for raising fish of claim 1 wherein the first and the second netting is made from a plastic material.

14. A cage for raising fish of claim 1 wherein the second mesh of the second netting is approximately twice as large as the first mesh of the first netting.

15. A cage for raising fish and adapted to rest on the bottom of an outdoor body of water, the cage comprising:

a frame defining outer boundaries of an enclosure having a top, a bottom and a side wall intersecting the top and bottom of the enclosure;

a first netting covering the top and side wall but not the bottom, the first netting having mesh openings sized to prevent other fish competing for food and predators of the fish from entering the enclosure bounded by the first netting;

a second netting covering the bottom of the enclosure, the second netting having second mesh openings larger than the first mesh openings and sized to permit plant and animal life on the bottom of the of the body of water to enter the enclosure while preventing the fish from leaving the enclosure bounded by the second netting;

a first door disposed in one of the top, bottom and side wall permitting access to the enclosure; and a second door overlaying the first door.

16. A cage for raising fish and adapted to rest on the bottom of an outdoor body of water, the cage comprising:

a frame defining outer boundaries of an enclosure having a top, a bottom and opposed ends and opposed sides intersecting the top and bottom of the enclosure;

a first netting covering the top, the ends and sides but not the bottom, the first netting having mesh openings sized to permit ambient water and particles therein to circulate within the enclosure as well as to prevent other fish competing for food and predators of the fish from entering the enclosure bounded by the first netting;

a second netting covering the bottom of the enclosure, the second netting having second mesh openings larger than the first mesh openings and sized to permit plant and animal life on the bottom of the of the body of water to enter the enclosure while preventing the fish from leaving the enclosure bounded by the second netting;

a first door formed by cutting a flap in the first netting on the top of the enclosure to permit access to the enclosure; and a second door formed from a flap of netting connected at one edge to the cage and overlaying the first door.

* * * * *